United States Patent [19]

Schneider et al.

[11] Patent Number: 5,371,323

[45] Date of Patent: Dec. 6, 1994

[54] SPLICE HOUSING APPARATUS

[75] Inventors: Pina R. Schneider, Holmdel; Thomas G. Graham, Ocean; Stanley B. Krawiec, Manalapan, all of N.J.

[73] Assignee: Keptel, Inc., Tinton Falls, N.J.

[21] Appl. No.: 28,841

[22] Filed: Mar. 10, 1993

[51] Int. Cl.⁵ .......................................... H02G 15/113
[52] U.S. Cl. ........................................ 174/92; 174/87; 174/138 F; 439/367; 439/465; 439/521; 439/687
[58] Field of Search ................. 174/92, 87, 138 F; 439/367, 465, 521, 687

[56] References Cited

U.S. PATENT DOCUMENTS

| | | | |
|---|---|---|---|
| 654,703 | 7/1900 | Bassett | 174/87 |
| 3,335,394 | 8/1967 | Miller | 439/465 |
| 3,550,765 | 12/1970 | Anderson | 174/87 X |
| 3,573,714 | 4/1971 | Turner | 439/465 |
| 3,624,270 | 11/1971 | Turner | 174/87 |
| 3,683,314 | 8/1972 | Elkins | 174/92 X |
| 3,879,575 | 4/1975 | Dobbin et al. | 174/92 |
| 4,176,245 | 11/1979 | Merlack et al. | 174/92 |
| 4,337,374 | 6/1982 | Smith | 174/138 F |
| 4,423,918 | 1/1984 | Filreis et al. | 174/91 X |
| 4,451,696 | 5/1984 | Beinhaur | 174/92 |
| 4,473,715 | 9/1984 | Beinhaur et al. | 174/87 |
| 4,859,809 | 8/1989 | Jervis | 174/92 |
| 4,909,756 | 3/1990 | Jervis | 174/76 X |
| 4,963,700 | 10/1990 | Olsen et al. | 174/138 F |
| 5,001,300 | 3/1991 | Messelhi | 174/87 |
| 5,140,746 | 8/1992 | Debbaut | 174/76 |

OTHER PUBLICATIONS

Klik-It® Buried Service Wire Enclosures, Communications Technology Corporation, Author & date unknown, Copy Attached.

3M, Slic 5-Pair Buried Service Wire Kit, Issue 2, Jun. 1991, Copy Attached.

Preformed Line Products, ©Copyright 1985, Preformed Line Products Co. Copy Attached.

Primary Examiner—Morris H. Nimmo
Attorney, Agent, or Firm—R. Gale Rhodes, Jr.

[57] ABSTRACT

Splice housing apparatus are provided on its interior with spacers or spacing members for engaging the splice or splices contained by the apparatus and for maintaining the splice or splices substantially out of engagement with the interior of the apparatus and generally suspended therein whereby a body of material for preventing water damage to the splice or splices can substantially surround the splice or splices and prevent water damage thereto.

27 Claims, 6 Drawing Sheets

SPLICE HOUSING APPARATUS

BACKGROUND OF THE INVENTION

This invention relates generally to splice housing apparatus for housing one or more splices between electrically conductive wires contained in cables, particularly, communication cables, and in particular this invention relates to splice housing apparatus suitable for burying in the ground and for protecting a cable splice or splices from water damage which can be caused, for example, by ground water.

Various apparatus are known to the art for housing or containing one or more cable splices and certain of these apparatus are known for being burled underground where there is a tendency for water to enter the apparatus and cause damage to the cable splices. Various bodies of material are known to the art for preventing water damage to such splices. Such bodies of material are also known for being placed in splice housing apparatus which is buried underground.

A problem known to splice housing apparatus for being buried underground is that the splice or splices contained in the apparatus tend to contact the interior surfaces of the apparatus and such contact prevents the body of water damage preventing material contained in the apparatus from entirely surrounding the splice or splices and exposes the unsurrounded splice or splices to water damage.

Accordingly, there exists a need in the art for new and improved splice housing apparatus, particularly apparatus for being buried underground, which includes means for maintaining the splice or splices contained in the apparatus substantially out of engagement with the interior of the apparatus and generally suspended within the apparatus, whereby a body of water damage preventing material contained in the apparatus can substantially fully surround such splice or splices and prevent water damage thereto.

SUMMARY OF THE INVENTION

The object of the present invention is to satisfy the foregoing need in the splice apparatus housing art.

Splice housing apparatus embodying the present invention and satisfying such need is provided on its interior with spacing means for engaging the splice or splices contained by the apparatus and for maintaining the splice or splices substantially out of engagement with the interior surfaces of the apparatus and generally suspended therein, whereby a body of material for preventing water damage to the splice or splices can substantially surround the splice or splices and prevent water damage thereto.

DESCRIPTION OF THE PREFERRED EMBODIMENT

Figures 1, 2:
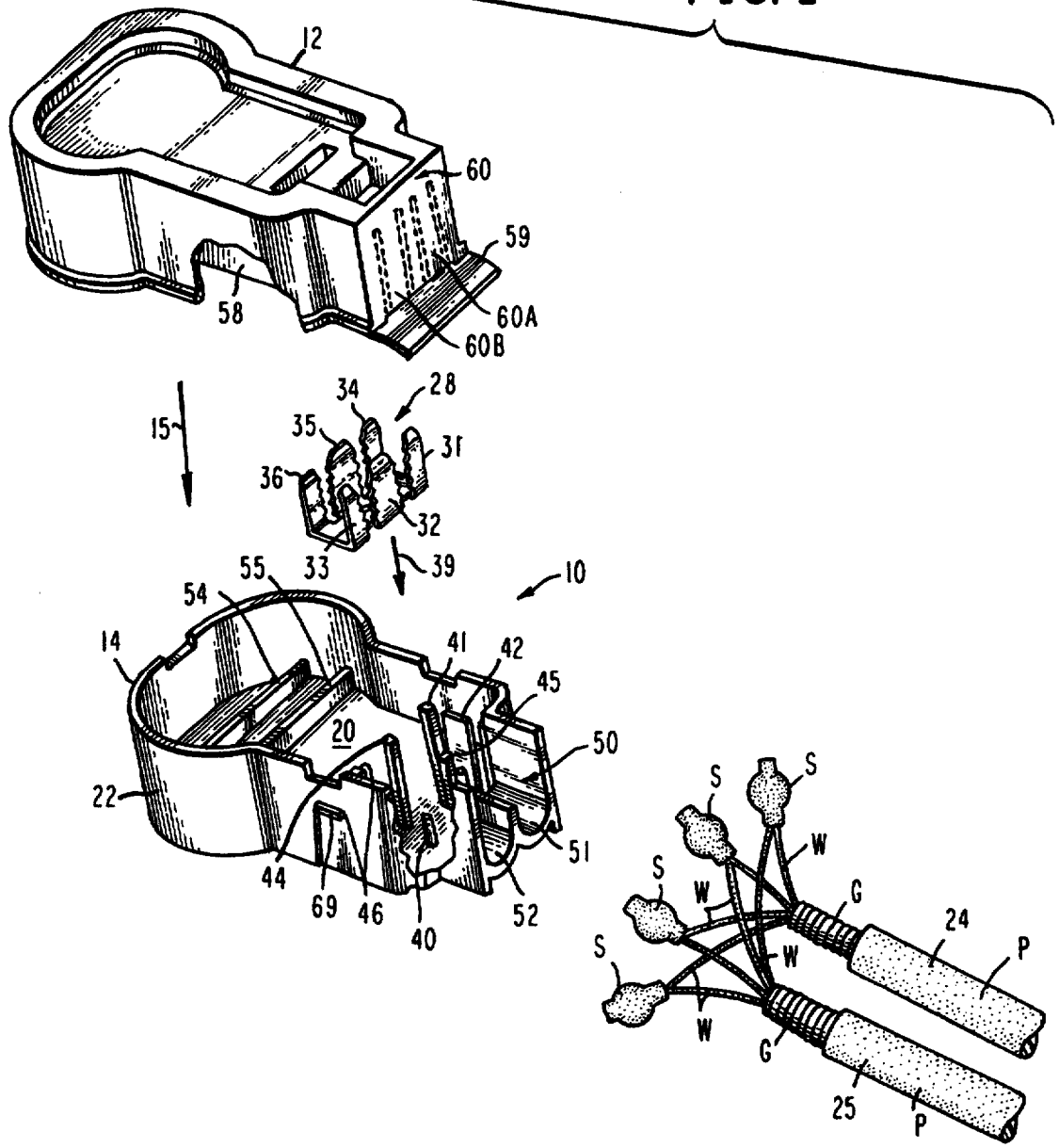
FIG. 1 is an exploded view, in perspective, of a first pair of housing members comprising a first embodiment of splice housing apparatus of the present invention, a portion of the bottom housing is broken away to show certain interior structure.
FIG. 2 is a perspective inverted view of the top housing member shown in FIG. 1.

Referring now to FIG. 1, there is shown a first embodiment of splice housing apparatus of the present invention which is indicated by general numerical designation 10, and which includes a first or top housing member 12 and a second or bottom housing member 14. It will be generally understood that the housing member 12 is slightly larger than the housing member 14 and that the housing members 12 and 14 are for being assembled together by placing the housing member 12 over the housing member 14 and by moving or forcing, with manual pressure, the housing member 12 downwardly, in the direction of the arrow 15, over the housing member 14 whereby the housing member 14 is inserted generally within the housing member 12.

The housing member 12, FIG. 2, includes a base 16 circumscribed by an outwardly extending wall 18, and the housing member 14, FIG. 1, includes a base 20 circumscribed by an outwardly extending wall 22. Upon assembly of the housing members it will be understood that the bases 16 and 20 are placed in an opposed and spaced apart relationship and that the interior surfaces of the bases 16 and 20 and the interior surface of the wall 22 provide in combination an interior chamber for receiving a splice or splices between the electrically conductive wires or conductors W (FIG. 1) contained in cables 24 and 25; cables 24 and 25 may be, for example, communication cables. The wires or conductors W are typically covered by a layer of insulation and the wires are typically spliced, or spliced together, by suitable splicing members known to the art which engage and mechanically and electrically interconnect the wires or conductors W and provide splices therebetween with such splices being contained within the splicing members; such prior art splicing members are indicated by the letter S in FIG. 1. Various splicing members S known to the art can provide splices between such wires or conductors whether such wires are covered with a layer of insulation or not. The cables 24 and 25 typically comprise radially inwardly an outer protective cover P, an electrically conductive ground shield G and a plurality of the aforementioned wires or conductors W. Typically, as is known, prior to splicing the wires W, portions of the outer protective covers P are removed to expose portions of the electrically conductive ground shields G.

Figure 1A:
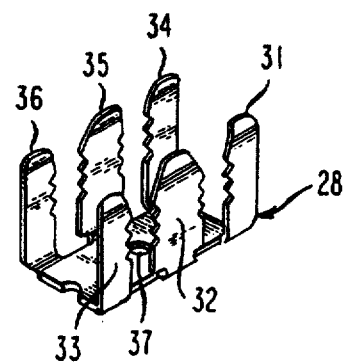
FIG. 1A is an enlarged view of the electrically conductive member or clip shown in FIG. 1.

Referring again to FIG. 1, and to FIG. 1A, the splice housing apparatus 10 may further include an electrically conductive member or clip indicated by general numerical designation 28, which clip includes a first set of spaced apart and upwardly extending members 31, 32 and 33, and second set of spaced apart and upwardly extending members 34, 35 and 36. The electrically conductive member 28 is provided with an opening 37, note FIG. 1A, and is mounted to the housing member 14 by being forced downwardly, as indicated by the arrow 39, in FIG. 1, to insert an upwardly extending pin 40 provided on the base 20 into opening or hole 37. Pin 40 and hole 37 are dimensioned to provide an interference engagement and a force fit therebetween. A plurality of upwardly extending members, note FIG. 1, are provided on the housing member 14 certain ones of which are indicated by numerical designations 41-46. The housing member 14, FIG. 1, is further provided with a first entrance indicated by general numerical designation 50 which entrance includes a pair of upwardly extending semi-circular portions 51 and 52 which are generally complementary in shape to and for engaging the outer circular surfaces of the protective covers P of the cables 24 and 25.

Upon the clip 28 being mounted to the housing member 14, the cables 24 and 25 are placed over the entrance 50 and forced downwardly in the direction of arrow 39 of FIG. 1 to place the splice members S, and the splices contained therein between the electrically conductive wires W, into the interior of the housing member 14, to force the protective covers P of the cables 24 and 25 between and into forced or wedged engagement with the upwardly extending members 31 and 32 and 32 and 33 and to force the ground shields G between and into forced or wedged engagement with the upwardly extending members 34 and 35 and 35 and 36. As may be noted from FIG. 1, the opposed surfaces of the sets of upwardly extending members 31-33 and 34-36 of the electrically conductive member 28 may be serrated to enhance the engagement with the protective covers P and ground shields G of the cables 24 and 25. Thus it will be understood that the pairs of opposed members 31 and 32 and 32 and 33 are gripping members for gripping and mounting the cables 24 and 25 substantially stationarily with respect to the housing member 14 and for substantially preventing axial withdrawal of the cables 24 and 25 from the housing member 14 upon an outward pulling force being applied to the cables 24 and 25. It will be further understood that the pairs of gripping members 34 and 35 and 35 and 36 are for gripping and electrically interconnecting the ground shields G of the cables 24 and 25. Since the electrically conductive member or clip 28 performs the dual function of electrical interconnection and gripping it is a combination member. It will be still further understood that upon the electrically conductive member or clip 28 being mounted to the upwardly extending pin 40 the clip is generally surrounded by the upwardly extending members 41-46 which, upon outward pulling forces being applied to the cables 24 and 25, engage the clip and prevent rotation from being imparted to the clip and the upwardly extending members between the mounted clip 28 and the entrance 50, only upwardly extending members 41, 44 and 45 being shown due to the break-away view of FIG. 1, cooperate with the mounting pin 40 to further prevent axial displacement of the clip 28 and the cables 24 and 25 from the housing member 14 upon such outward pulling forces being applied to the cables 24 and 25.

To substantially prevent the splicing members S, and the splices between the wires W contained therein, from engaging the interior surfaces of the housing members 12 and 14 and the interior surface of the wall 22, the base 20 of the housing member 14, FIG. 1, is provided with a plurality of outwardly extending rib-like members 54 and 55 and the base 16 of the housing member 12 is provided with a plurality of outwardly extending cylindrical or conical members 57. Upon assembly of the housing members 12 and 14, the rib-like members 54 and 55 and the conical members 57 extend outwardly towards each other and are placed in an opposed and spaced apart relationship. The rib-like members 54 and 55 and cylindrical or conical members 57 are for engaging the splicing members S and for maintaining the splicing members S, and the splices between the wires W contained therein, substantially out of engagement with the interior surfaces of the opposed bases 16 and 20 and the interior surface of the wall 22 of the housing member 14, and are for maintaining the splicing members S, and the splices between the wires W contained therein, generally suspended within the interior chamber provided by such interior surfaces. Thus, it will be understood that the rib-like members 54 and 55 and the conical members 57 may be considered to be spacers or spacing members.

To substantially prevent water damage to the splices between the wires W contained within splicing members S, particularly upon the splice housing apparatus being buried in the ground and exposed to water especially ground water, the housing member 12, prior to assembly with housing member 24, may be filled with a body of suitable water damage preventing material, encapsulant or gel indicated in FIG. 1 by numerical designation 58. In the preferred embodiment of the present invention such water damage preventing material 58 is included with the splice housing apparatus of the present invention and may be suitably contained or sealed within the housing member 12 by a suitable removable seal 59 which, for example, may be a layer of polyester film suitably sealed to the top of the wall 18 of the housing member 12 as shown in FIG. 1; a portion of the removable seal 59 may extend outwardly of the end portion 60 of the housing member 12 to provide a pull-tab for ready removal of the seal 59. Prior to assembly of the housing members 12 and 14, the seal 59 is removed, and during assembly as the housing member 12 is moved or forced over the housing member 14 to insert the housing member 14 generally into the housing member 12, the water damage preventing material 58 is placed or forced into surrounding engagement with the splicing members S.

Figure 3:
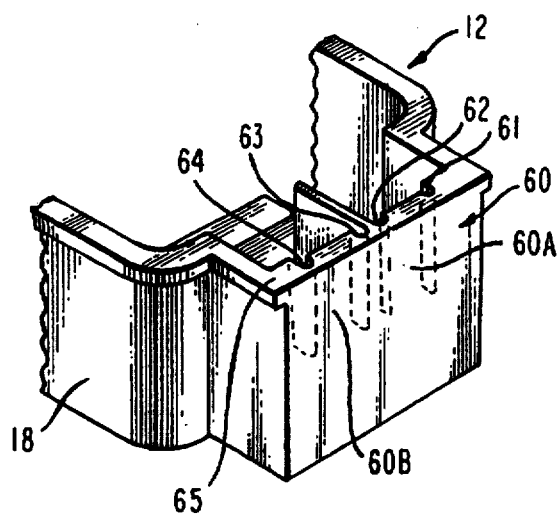
FIG. 3 is a partial view of FIG. 2 but showing structural elements in greater detail.
Figure 4:
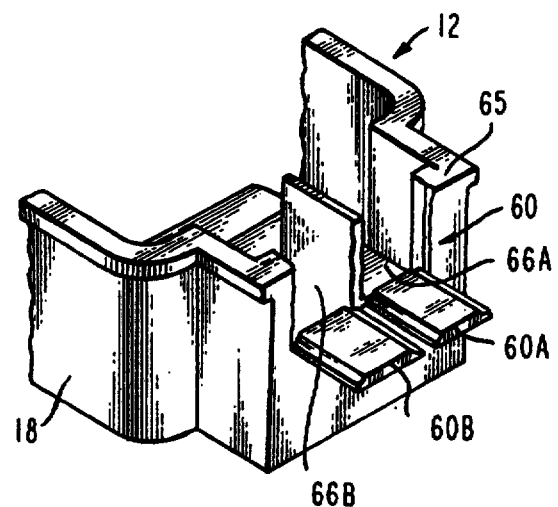
FIG. 4 is a view similar to FIG. 3 but showing end or membrane portions broken away from and folded outwardly with respect to the housing member.

Referring to FIGS. 1-4, and again to housing member 12, it will be understood that the end portion 60 of the housing member 12 may include end or membrane portions 60A and 60B (FIG. 3) which are defined, respectively, by the pairs of grooves 61 and 62 and 63 and 64 extending inwardly into the wall 65. It will be understood from FIG. 3 that the end portions 60A and 60B are provided with a reduced wall thickness as compared to the thickness of the end wall 65 whereby upon the cables 24 and 25 being mounted to housing 14 as described above and with the housing member 12 being manually forced downwardly in the direction of the arrow 15 in FIG. 1 and over the housing member 14, the end or membrane portions 60A and 60B forcibly engage the outer protective covers P of the cables 24 and 25 which engagement causes the end or membrane portions 60A and 60B (FIG. 3) to rupture or break-away from the end wall 60 along the grooves 61 and 62 and 63 and 64 (FIG. 3) and fold outwardly from the end wall 60 as shown in FIG. 4 to provide generally rectangular openings or apertures 66A and 66B (FIG. 4) for receiving portions of the cables 24 and 25 (FIG. 1) at their entrance into the entrance 50 of the housing member 14.

Figure 5:
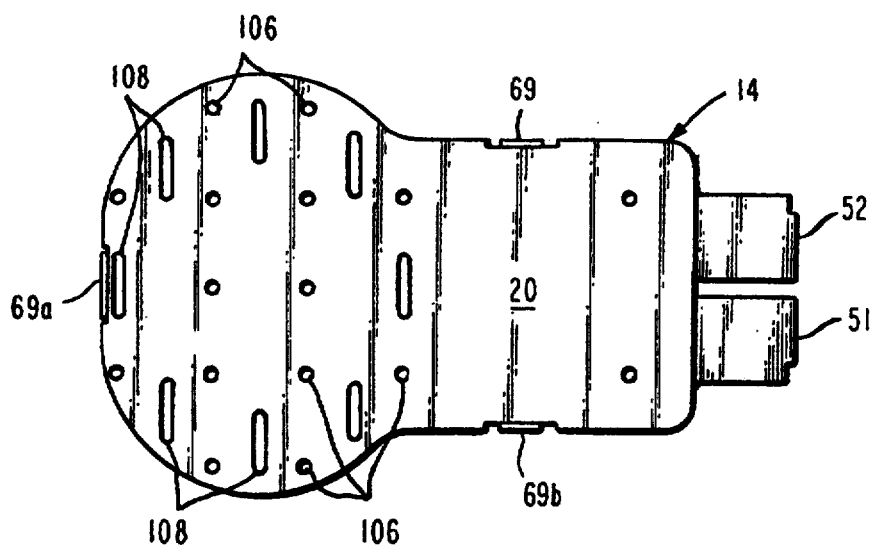
FIG. 5 is a bottom plan view of the bottom housing member shown in FIG. 1.

To prevent unwanted and easy disassembly of the housing members 12 and 14, or the unwanted or easy withdrawal of the housing member 14 from the housing member 12, the inner surface of the wall 18 of the housing member 12 (FIG. 2) may be provided with areas of pluralities of ratchet-like teeth, only areas 67 and 68 being shown in FIG. 2, and the outer surface 22 of the housing member 14, FIGS. 1 and 5, may be provided with a plurality of pawl-like members for engaging the ratchet-like teeth thereby substantially maintaining the housing members 12 and 14 together upon assembly thereof; a single pawl-like member 69 is shown in FIG. 1 and pawl-like members 69, 69a and 69b are shown in FIG. 5. It will be understood that the areas of ratchet-like teeth and the pawl-like members are equal in number and placed in corresponding positions on the respective housing members 12 and 14 such that they engage during assembly of the housing members; the last tooth of each area of the ratchet-like teeth to be engaged by a pawl-like member may be larger or longer than the other teeth of the area to provide a more positive lock and a tactile indication, to the person assembling the housing members 12 and 14, of complete assembly of such housing members.

Figure 6:
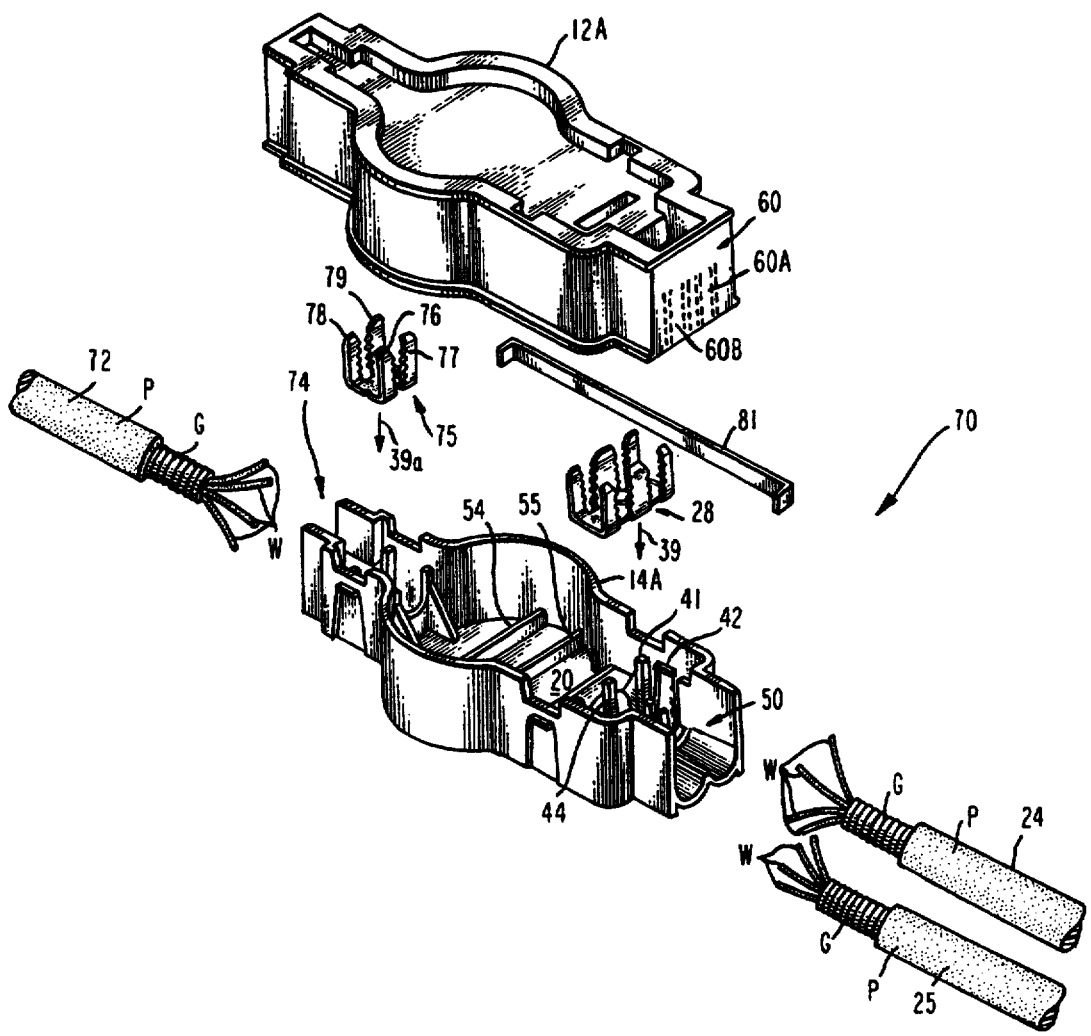
FIG. 6 is an exploded view, in perspective, of a second pair of housing members comprising a second splice housing apparatus embodiment of the present invention.

Referring now to a further embodiment of the splice housing apparatus of the present invention indicated by general numerical designation 70 and shown in FIG. 6, it will be understood that for convenience of presentation and understanding, elements shown in FIG. 6 which are the same as elements shown in FIGS. 1–5 are given the same numerical designations and will not be re-introduced and their structure will not be specifically described again; only the new elements shown in FIG. 6 will be introduced and their structure specifically described. Generally, it will be understood that splice housing apparatus 70 of FIG. 6 differs from splice housing apparatus 10 of FIG. 1, in that the splice housing apparatus 70 of FIG. 6 is for housing splices between the electrically conductive wires W of any combination of three cables, namely cables 24 and 25 and 72. Housing member 14A is provided with a pair of opposed entrances indicated by general numerical designations 50 and 74 with entrance 50 for admitting cables 24 and 25 into the housing member 14A and with entrance 74 for admitting entrance of cable 72 into the housing member 14A. Splice housing apparatus 70 includes an electrically conductive member or clip indicated by general numerical designation 75 including a first set of spaced apart and upwardly extending members 76 and 77, and a second set of spaced apart and upwardly extending members 78 and 79. It will be understood that electrically conductive member or clip 75 is mounted to housing member 14A and prevented from rotation with respect to the housing member 14A and prevented from withdrawal from the housing member 14A in the same manner that electrically conductive member or clip 28 of FIG. 1 is with regard to housing member 14, and that members 78 and 79 are gripping members for gripping the protective cover P of cable 72 and that the members 76 and 77 are for engaging and electrically interconnecting to the ground shield G of cable 72. The splice housing apparatus 70 of FIG. 6 may further include an electrically conductive shorting bar 81 for being received within the housing member 14A and for engaging and electrically interconnecting the electrically conductive members 75 and 28, thereby electrically interconnecting the ground shields G of the cables 24 and 25 and 72. It will be understood that the end portion (not shown) of the housing member 12A, FIG. 6, opposite the end portion 60, may include an end or membrane portion which has the same structure and functions in the same manner with regard to cable 72 as the end or membrane portions 60A and 60B of FIG. 1 do with respect to cables 24 and 25 (FIG. 1) to provide a generally rectangular opening or aperture for receiving the cable 72 at its entrance into the entrance 74 of the housing member 14A. The housing member 12A may be provided with a plurality of outwardly extending conical members, not shown, in the same manner that the housing member 12 of FIG. 2 is provided with a plurality of outwardly extending conical members 57. Further, the housing member 12A may be filled with a suitable water damage preventing material, such as water damage preventing material 58 of FIG. 1, and such water damage preventing material may be suitably sealed in the housing member 12A by a suitable seal (not shown) such as seal 59 shown in FIG. 1 and described above. It will be understood that suitable splicing members S, not shown in FIG. 6, may be utilized to make splices between certain wires or conductors W contained in any combination of cables 24 and 25 and 72. Upon such splices being made, and the cables 24 and 25 being inserted into the entrance 50 of housing member 14A, and upon the cable 72 being inserted into the entrance 74 of the housing member 14A, the housing members 12A and 14A are assembled in the same manner as described above with regard to housing members 12 and 14 shown in FIG. 1 with the water damage preventing material contained in the housing member 12A being placed or forced into surrounding engagement with the splicing members S containing splices between the cables 24 and 25 and 72. It will be understood that if desired only one cable may be inserted into entrance 50 and the wires W contained therein spliced to the wires W contained in cable 72.

Figure 7:
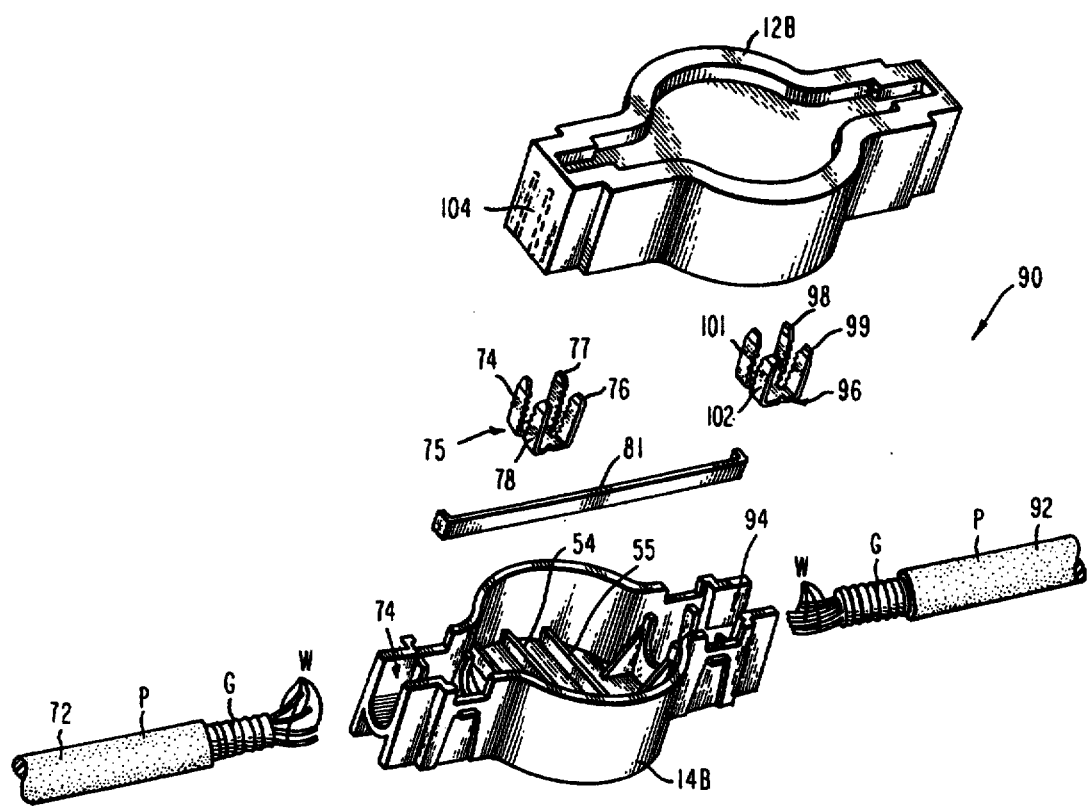
FIG. 7 is an exploded view, in perspective,,of a third pair of housing members comprising a third splice housing apparatus embodiment of the present invention.

A still further embodiment of the splice housing apparatus of the present invention is illustrated in FIG. 7 and indicated by general numerical designation 90. For convenience of presentation and understanding, elements shown in FIG. 7 which are the same as elements shown in FIGS. 1–6 are given the same numerical designations and will not be re-introduced and their structure will not be specifically described again; only the new elements in FIG. 7 will be introduced and their structure specifically described. Generally, it will be understood that splice housing apparatus 90 of FIG. 7 differs from that shown in FIGS. 1–6, in that apparatus 90 is for housing splices between the wires or conductors W of a single cable 72 inserted within entrance 74 and the wires or conductors W contained within a single cable 92 inserted within the entrance indicated by general numerical designation 94. Splice housing apparatus 90 may include an electrically conductive member or clip indicated by general numerical designation 96 mounted to, prevented from rotation with respect to, and withdrawal from the housing member 14B in the same manner as the electrically conductive member or clip 28 is with regard to the housing member 14 of FIG. 1. The members 98 and 99 are for gripping the protective cover P of cable 92, and the gripping members 101 and 102 are for gripping and electrically interconnecting with or to the ground shield G of cable 92. Each of the opposed end portions of the housing member 12B, FIG. 7, may be provided with an end or membrane portion, only end or membrane portion 104 is shown in FIG. 7, which end or membrane portions have the same structure and function in the same manner with regard to cables 72 and 92 as membrane portions 60A and 60B of FIG. 1 do with respect to the cables 24 and 25 at their respective entrances into the housing member 14. The housing member 12B may be provided with a plurality of outwardly extending conical spacing members, not shown, in the same manner that the housing member 12 of FIG. 2 is provided with the plurality of outwardly extending conical members 57. The housing member 12B may be filled with suitable water damage preventing material in the same manner that the housing member 12 of FIG. 1 is provided with water damage preventing material 58. Assembly of the housing members 12B and 14B is performed in substantially the same manner as assembly of the housing members 12 and 14 of FIG. 1 and 12A and 14A of FIG. 6 to generally surround the splicing members S, not shown in FIG. 7, and the splices contained therein, with water damage preventing material.

As is known to those skilled in the art, a splice between a pair of cable wires or conductors can be made without the use of splicing members, such as splicing members S of FIG. 1, and can be made, for example, by twisting exposed or bare wires or conductors together to mechanically and electrically interconnect the wires or, a splice may be made between such bare or exposed wires by the use of solder or other electrically conductive adhesive means. Accordingly, it will be understood that the splice housing apparatus of the present invention may be used to contain and support one or more splices between electrically conductive wires of a cable whether such electrically conductive wires are spliced together directly or spliced together using splicing members such as splicing members S of FIG. 1.

Referring again generally to the splice housing apparatus 70 of FIG. 6 and the splice housing apparatus 90 of FIG. 7, it will be noted that the entrances 50 and 74 shown in FIG. 6, and the entrances 94 and 74 shown in FIG. 7, are oriented in an opposed relationship or oriented angularly with respect to each other at 180°; however, it will be understood that such pairs of entrances may be oriented with respect to each other at angular orientations other than 180°, such as for example 90°.

The water damage preventing material, e.g. water damage preventing material 58 of FIG. 1, preferably is an extrudable material so as to enhance or facilitate placing or forcing of the water damage preventing material into surrounding engagement with the splicing members S. Referring now to FIG. 5, an exterior view of the bottom base 20 of housing member 14, it will be understood that the base 20 may be provided with a plurality of circular apertures or openings 106 extending therethrough and a plurality of oblong apertures or openings 108 extending therethrough; these openings are not shown in FIG. 1 for clarity and simplicity of presentation. The openings 106 and 108 permit portions of the water damage preventing material to be extruded therethrough upon assembly of the housing members 12 and 14 with hand or manual pressure to assure that the splicing members S have been substantially surrounded with such material and to provide a visual indication thereof to the person assembling the housing members 12 and 14. It will be further understood that the respective sizes of the interiors of the housing members 12 and 14 are such that the volume of water damage preventing material provided in the housing member 12, FIG. 1, is greater than the interior volume of housing member 14 upon the housing member 14 housing or containing at least one splice or splicing members S; this relationship assures that upon assembly of the housing members 12 and 14 as described above, water damage preventing material will completely fill the housing member 14, substantially surround the splice or splicing members S and any air entrapped within the assembled housing members 12 and 14, and that portions of such material will be extruded out of the openings 106 and 108 (FIG. 5) to provide the visual indication noted above. It will be further understood that the volume of the water damage preventing material 58 contained in the housing 12, FIG. 1, is sufficient to assure that at least a portion thereof will be extruded outwardly between the cables 24 and 25 and the end portion 60 of the housing member 12 providing the rectangular openings 66A and 66B, FIG. 4, to further assure that the splice or splicing members S contained in the assembled housing members 12 and 14 have been surrounded and that any entrapped air has been expelled. A portion of such water damage preventing material will reside between the cables 24 and 25 and the end portions 60 of the housing member 12, FIG. 4, to provide a seal between the cables and the end portion 60 of the housing member 12 defining the openings 66A and 66B. Referring again to the oblong openings 108 and circular openings 106 provided in the base 20 of the housing member 14, FIG. 5, it has been discovered that by using both oblong openings and circular openings, and by placing such openings in the pattern shown in FIG. 5, that the extrusion of the water damage preventing material through such openings is enhanced and enabled by the use of only manual pressure applied by a person in assembling the housing members 12 and 14. Similarly, water damage preventing material is forced into surrounding engagement with the splices and splicing members interconnecting the wires W in the embodiments 70 and 90 of the present invention shown in FIGS. 6 and 7.

Clean handling and assembly of the various embodiments of the splice housing apparatus of the present invention described above and shown in the drawings may be accomplished by the inclusion of a transparent plastic bag in which the splice housing apparatus embodiments of the present invention may be packaged. By way of example with regard to splice housing apparatus 10 of FIG. 1, upon the cables 24 and 25 being mounted to the housing member 14 as described above, the housing member 14 may be placed in such plastic bag with the cables 24 and 25 extending outwardly through the bag opening. The seal 59 for the water damage preventing material 58 may be removed from the housing member 12 and the housing member 12 inserted into the bag whereafter the actual assembly of the housing members 12 and 14 as described above may be performed within the plastic bag by manual pressure or forces being applied to the outside of the bag by the person assembling the housing members. Thus, assembly of the housing members 12 and 14, and the extrusion of the water damage preventing material as described above, may take place inside of the plastic bag whereby the excess or extruded water damage preventing material will be contained in the bag and the hands of the person doing the assembly will remain clean. Thereafter, the plastic bag surrounding the assembled housing members 12 and 13 may be buried with them to provide further water damage prevention to the splices or splicing members S contained within the assembled housing members.

Figure 8:
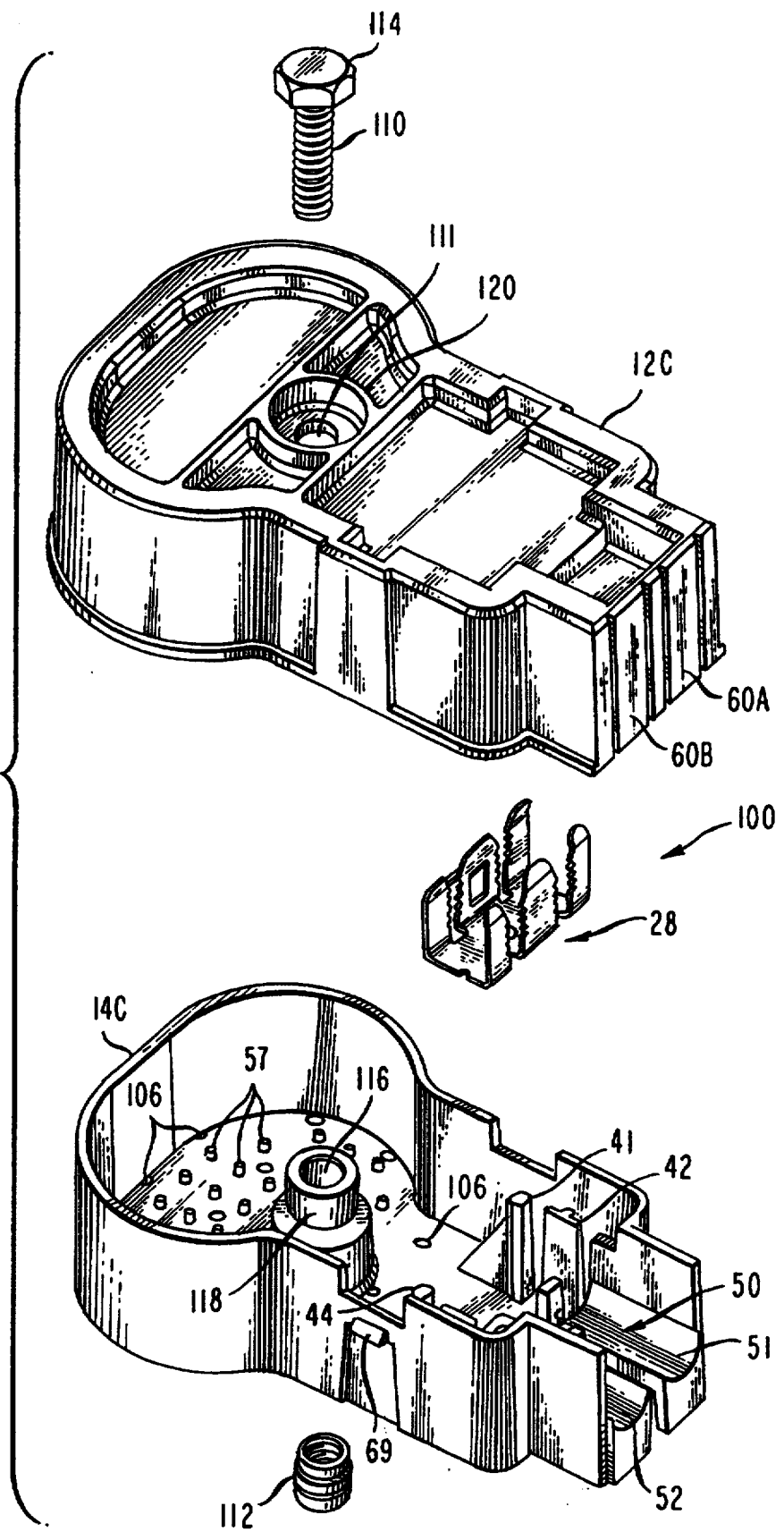
FIG. 8 is an exploded view, in perspective, of a fourth pair of housing members comprising a splice housing apparatus embodiment of the present invention.

Referring now to a further embodiment of the splice housing apparatus of the present invention indicated by general numerical designation 100 in FIG. 8, it will be understood that for convenience of presentation and understanding the elements shown in FIG. 8 which are the same as elements shown in the earlier described FIGS. are given the same numerical designations and will not be re-introduced and the structure will not be specifically described again; only the new elements shown in FIG. 8 will be introduced and their structure specifically described. Particularly it will be understood that splice housing apparatus 100 of FIG. 8 differs from splice housing apparatus 10 of FIG. 1 in that the splice housing apparatus 100 is provided with a rotatable externally threaded member or bolt 110 and an internally threaded insert 112 for providing mechanical advantage in assembly of the housing members 12D and 14C beyond that which may be obtained typically by the hands or fingers of a person merely pressing the two housing members together for assembly and forcing the water damage preventing material into surrounding engagement with the splicing members 5 as described above. Splice housing apparatus 100 is particularly useful when the water damage preventing material contained in housing member 12C (not shown in FIG. 8 but shown and identified in FIG. 1 by general numerical designation 58) is of relatively high viscosity and assembly Of the housing members takes place at lower temperatures such as encountered outside in the winter. The threaded member or bolt 110 is inserted through an opening 111 formed in the housing 12C to threadedly engage the internally threaded insert 112 which is mounted fixedly or stationarily, in any one of several manners known to the art, within the opening 116 provided in the boss 118 extending upwardly from the base 20 of the housing member 14C. For convenience, and to prevent physical separation of the housing 12C and the threaded member or bolt 110, the bolt 110 may be mounted rotatably within the boss 120 in any one of several manners known to the art. The threaded bolt or member 110, in one embodiment, was threaded 20 turns per inch and was provided with a hexagonal head 114 permitting the threaded member or bolt 110 to be tightened by a commonly carried wrench known to the art as a "can" wrench or by a tool known in the art as a "216 tool." Also, in the embodiment of FIG. 8, the housing member 14C, instead of being provided with the spacing members or ribs 54 and 55 of FIG. 1, is provided with a plurality of upwardly extending cylindrical or conical spacing members 57 which may be the same as the conical or cylindrical spacing members 57 provided on the inner surface of the base 16 of the housing member 12 as shown in FIG. 2; similarly the housing member 12C may be provided with a plurality of outwardly extending conical spacing members such as members 57 shown in FIG. 2. The boss 118, which may be formed integrally by being molded with the housing member 14C, may be provided with a predetermined height so as to contact the inner surface of the housing member 12C as the housing members are assembled and the water damage preventing material forced into the housing member 14C to prevent over-tightening of the bolt 110 and possible crushing or other damage of the assembled housing members. The housing member 14C may be provided with a plurality of holes 106 to permit portions of the water damage preventing material to be extruded therethrough upon assembly of the housing members 12C and 14C to assure that splicing members contained between the housing members, such as splicing members S in FIG. 1, have been substantially surrounded with such water damage preventing material and provide a visual indication thereof to the person assembling the housing members 12C and 14C. It will be understood that the underside of the housing member 14C may be provided with a plurality of outwardly extending ribs (not shown) adjacent the holes 106 to enable the housing member 14C to be placed down on a flat surface without the holes 106 being blocked off by the surface thereby facilitating extrusion of water damage preventing material out of the holes 106.

Figure 9:
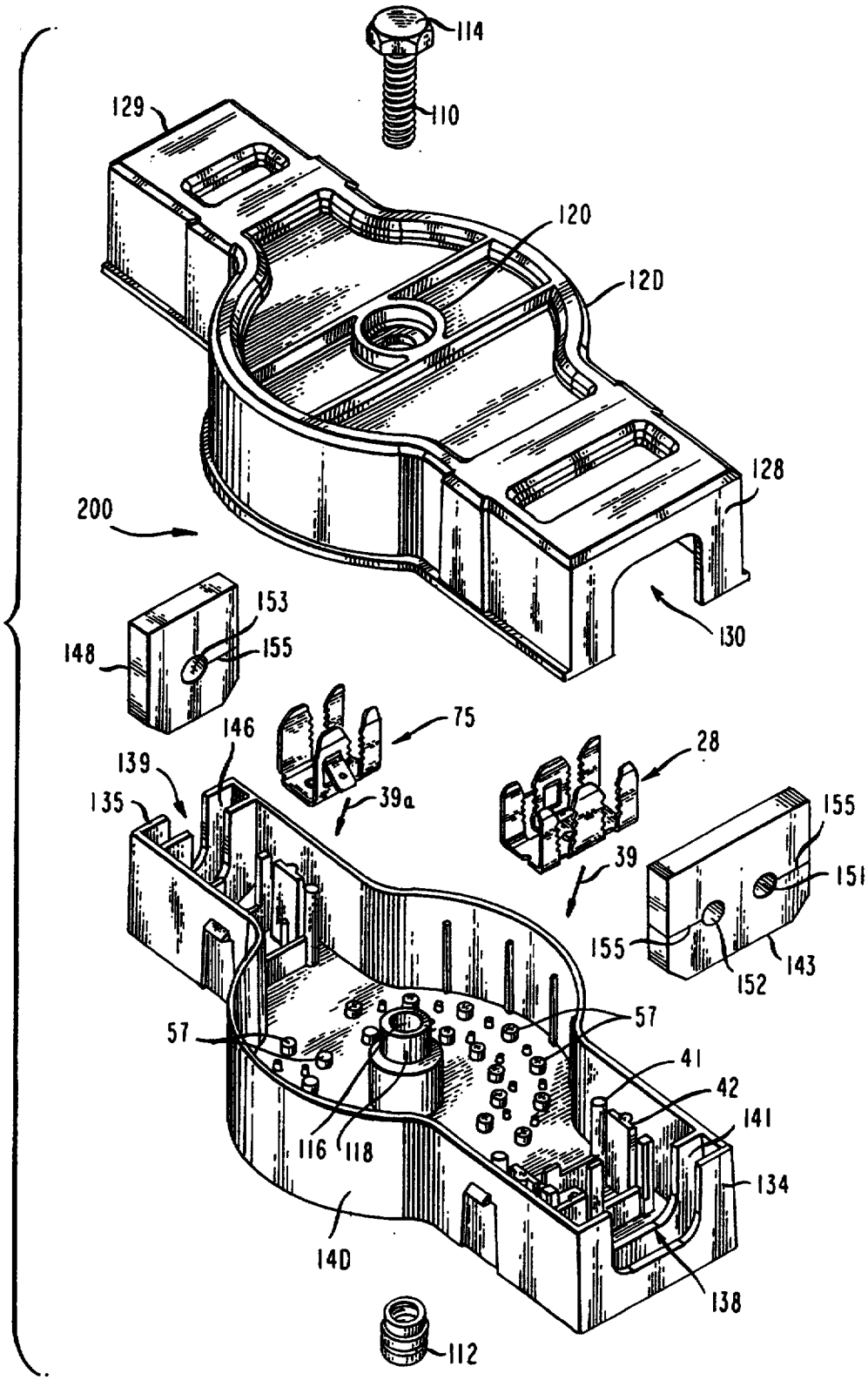
FIG. 9 is an exploded view, in perspective, of a fifth pair of housing members comprising a splice housing apparatus embodiment of the present invention.

Another embodiment of the splice housing apparatus of the present invention is illustrated in FIG. 9 and indicated by general numerical designation 200; it will be understood that for convenience of reference and understanding elements shown in FIG. 9 which are the same as elements shown in the earlier described FIGS., particularly FIGS. 1, 6, 7 and 8, are given the same numerical designations and will not be re-introduced and their structure will not be specifically described again. Only the new elements shown in FIG. 9 will be introduced and their structure specifically described. More particularly, it will be understood that the splice housing apparatus 200 shown in FIG. 9 is similar to splice housing apparatus 70 of FIG. 6 in that splice housing apparatus 200 is for housing splices between electrically conductive wires W of any combination of three cables such as for example cables 24 and 25 and 72 shown in FIG. 6 and described above. In this embodiment, the opposed end portions 128 and 129 of housing member 12D are provided with opposed entrance openings 130 and 131, only the opening indicated by general numerical designation 130 is shown in FIG. 9 but it will be understood that end portion 129 has a corresponding opening 131 (not shown) formed therein; the opening 130 is for admitting the entrance thereinto of a pair of cables, such as cables 24 and 25 shown in FIG. 6, and with the opening 131 not shown but formed in the end 129 portion for admitting a single cable such as cable 72 shown in FIG. 6. The opposed end portions 134 and 135 of the housing member 14D are provided with a pair of opposed openings indicated by general numerical designations 138 and 139 for admitting, respectively, cables 24 and 25 and cable 72 as shown in FIG. 6. End portion 134 of housing member 14D provides a slot 141 for receiving a grommet 143 and the end portion 135 provides a slot 146 for receiving a grommet 148.

The grommets 143 and 148 may be made of a commercially available resilient closed-cell foam plastic material. The grommets may be pre-cut, respectively, to have cylindrical slugs 151 and 152 and 153 retained therein and which slugs may be pushed out manually to provide the grommet 143 with two holes or passageways for receiving two cables and to provide the grommet 148 with a single hole or passageway for receiving a single cable. The grommets may be provided with side cuts or slots 155 for permitting the cables to be conveniently inserted into the grommets from the side.

The splice housing apparatus 200 of FIG. 9, including the foam plastic grommets 143 and 148, is particularly useful upon the water damage preventing material being, for example, a two component encapsulant of the type known to the art. As is known with such two component encapsulant, the two components comprising the encapsulant are typically liquid, or semi-liquid, and are mixed together and react to later produce a substantially solid encapsulant upon reacting or hardening.

Upon cable splices, such as cable splices S shown in FIG. 1 being present in housing member 14D of FIG..9, such two component encapsulant in the liquid or semi-liquid stage may be poured into the housing member 14D to surround such splices and fill the housing member 14D. The foam plastic grommets 143 and 148 will form barriers or seals to prevent the liquid or semi-liquid encapsulant from freely flowing out of the opposed open ends 138 and 139 of the housing member 14D upon the housing members 12D and 14D being assembled and before the encapsulant hardens. However, upon the housing member 12D being assembled to the housing member 14D as described above, particularly using the mechanical advantage provided by the threaded member or bolt 110 and threaded insert 112, any excess encapsulant in the liquid stage will be squeezed out of or through the closed-cell foam plastic grommets 143 and 148 to provide a visual indication that the splices have been surrounded and encapsulated; also any air entrapped in the assembled housing members will be expelled.

Referring again generally to the FIGS., and the embodiments of the splice housing apparatus of the present invention shown in the FIGS. and described above, it will be noted that the housing members of each embodiment include relatively enlarged and outwardly extending portions to provide room for the splicing members S, and the splicing members contained therein, to be spread outwardly to enhance the maintaining of the splicing members S out of engagement with the interior surfaces of the housing members as described above and generally suspended within the chamber provided by such interior surfaces. It will be further noted that the other portions of the housing members are relatively small, and this permits the use of a smaller quantity of water damage preventing material than would be required were the housing members to be uniformly circular or rectangular.

It will be further understood that the housing members shown in the FIGS. and described above may be molded, such as for example by suitable injection molding, and may be made of a suitable plastic, such as for example polypropylene. Further, the electrically conductive members 28, 75 and 96 shown in the FIGS. and described above may be made of pre-tempered stainless steel. Further, it will be understood that the ends or membrane portions 60A and 60B of FIGS. 1 and 6, and 104 of FIG. 7, may be made or formed by molding the portions of the end walls of the housing members defining such end or membrane portions to be substantially thinner than the remaining portions of such wall and to have the grooves such as pairs of grooves 61 and 62 and 63 and 64 shown in FIG. 2 whereby such thin portions are readily rupturable along such grooves upon engagement with the respective cables to provide the openings for receiving such cables as described above.

It will be understood that the water damage preventing material 58 may be any one of several such water damage preventing materials, gels or encapsulants known to the art and may be, for example a suitable petroleum based gel or grease, such as for example VASELINE ® brand petroleum jelly sold by Cheeseborough Ponds Inc. of Greenwich, Conn. 06830.

Lastly, it will be understood that many variations and modifications may be made in the present invention without departing from the spirit and the scope thereof.

What is claimed is:

1. Apparatus for housing at least one splice between electrically conductive wires contained in at least two cables and for surrounding the splice with a body of material for substantially preventing water damage to the splice, comprising:

housing means for housing the splice, said housing means including a pair of housing members each including a base circumscribed by an outwardly extending wall, said housing members for being assembled together with one of said housing members for being inserted generally into the other of said housing members, upon assembly of said housing members said bases being placed in opposed and spaced apart relationship and providing in combination with the wall of one of said housing members an interior chamber for receiving the body of material and the splice generally surrounded by the body of material; and spacing means including first and second spacing means provided respectively on and extending outwardly from said bases; upon said assembly of said housing members said first and second spacing means extending generally towards and spaced apart from each other, and said first and second spacing means for engaging the splice to maintain the splice out of engagement with said bases and suspended generally within said interior chamber to facilitate surrounding of the splice by the body of material.

2. The apparatus according to claim 1 wherein said housing members are provided with cooperative means providing a mechanical advantage for the assembly of said housing members.

3. The apparatus according to claim 2 wherein said cooperative means include a rotatable externally threaded member extending inwardly into one of said housing members and an stationary internally threaded member extending inwardly into the other of said housing members, said rotatable externally threaded member for being threaded into said internally threaded member to provide said mechanical advantage.

4. The apparatus according to claim 3 wherein said stationary internally threaded member is mounted in a generally cylindrical boss extending inwardly into said other housing member and wherein said boss is provided with a predetermined height for contacting said one housing member to prevent over tightening between said externally and internally threaded members and damage to said housing members during assembly.

5. The apparatus according to claim 1 wherein said apparatus further includes the body of material for substantially preventing water damage, wherein said body of material is received within one of said housing members prior to said assembly of said housing members.

6. The apparatus according to claim 5 wherein said apparatus further comprises a removable seal for being temporarily sealed over said one housing member and said seal for being removed prior to said assembly of said housing members to permit said body of material to be placed into surrounding engagement with the splice during said assembly of said housing members.

7. The apparatus according to claim 6 wherein each of the cables comprise radially inwardly an outer protective cover, an electrically conductive ground shield and a plurality of electrically conductive wires, wherein prior to the splice being made between the wires a portion of the outer protective cover of each of the cables is removed to expose a portion of the electrically conductive ground shields, wherein said other housing member is provided with entrance means for admitting the entry of the cables into said housing member prior to said assembly of said housing members, wherein said apparatus further comprise gripping means mounted in said other housing member proximate said entrance means, said gripping means for gripping and mounting the cables substantially stationarily with respect to said other housing member and for substantially preventing withdrawal of the cables from said housing means upon said assembly of said housing members and said gripping means for gripping and electrically interconnecting the ground shields, and wherein said one housing member is provided with at least two membrane portions for engaging the cables upon said assembly of said housing members and said membrane portions for being at least partially broken away from and bent outwardly with respect to said one housing member to provide openings for receiving the cables at the entry of the cables into said entrance means.

8. The apparatus according to claim 7 wherein the inner surface of one of said walls and the outer surface of the other of said walls are provided with cooperating retaining means for substantially preventing the withdrawal of said one housing member from said other of said housing members upon said assembly of said housing members to thereby substantially maintain said housing members in said assembly after said insertion of said one housing member generally into the other of said housing members.

9. The apparatus according to claim 8 wherein said cooperating retaining means comprise a pawl-like member and an area of ratchet-like teeth for being engaged by said pawl-like member.

10. The apparatus according to claim 9 wherein the last tooth of said ratchet-like teeth to be engaged by said pawl-like member is larger than the other teeth of said area to provide a tactile indication that said housing members have been assembled.

11. The apparatus according to claim 8 wherein each of said housing members include first and second portions and wherein said second portion is smaller in size than said first portion to reduce the amount of said body of material required to surround said splice.

12. The apparatus according to claim 5 wherein upon assembly of said housing members entrapped air can reside within said housing means, wherein said body of material for substantially preventing water damage to said splice is extrudable material and wherein said base of said other housing member is provided with a plurality of openings through which portions of said body of extrudable material are extruded and said entrapped air is expelled upon said insertion of said one housing member generally into said other housing member to provide a visual indication that said body of material has generally surrounded the splice and expelled the entrapped air.

13. The apparatus according to claim 1 wherein said first spacing means comprise a plurality of rows of rib-like members extending outwardly from one of said bases and wherein said second spacing means comprise a plurality of generally conical members extending outwardly from the other of said bases.

14. The apparatus according to claim 1 wherein said housing means is provided with at least first entrance means for admitting the entrance of the at least two cables into said housing.

15. The apparatus according to claim 1 wherein said housing is provided with at least first and second entrance means each for admitting the entrance of at least one cable into said housing means.

16. The apparatus according to claim 14 or 15 wherein said body of material for substantially preventing water damage to said splice is initially substantially liquid and later hardens, and wherein each of said entrance means is provided with sealing means for preventing said material from freely flowing out of each of said entrance means upon said material being substantially liquid.

17. The apparatus according to claim 16 wherein each of said entrance means is provided with a slot and wherein said sealing means comprises a grommet of closed-cell foam plastic for being receiving within said slot, said closed-cell foam plastic permitting excess substantially liquid material to escape therethrough and permitting entrapped air to escape therethrough.

18. The apparatus according to claim 15 wherein said first and second entrance means are oriented in a predetermined angular relationship with respect to each other, and wherein said predetermined angular relationship is other than parallel.

19. The apparatus according to claim 18 wherein said predetermined angular relationship is substantially 180° whereby said first and second entrance means are oriented substantially opposite to each other.

20. The apparatus according to claim 14 wherein each of the cables comprise radially inwardly an outer protective cover, an electrically conductive ground shield and a plurality of the electrically conductive wires, wherein prior to the splice being made a portion of the outer protective cover of each of the cables is removed to expose a portion of the electrically conductive ground shields, and wherein said apparatus further includes electrically conductive means for electrically interconnecting the ground shields.

21. The apparatus according to claim 20 wherein said electrically conductive means include at least first and second electrically conductive members for engaging and electrically interconnecting the ground shields.

22. The apparatus according to claim 21 wherein said electrically conductive means include a shorting bar for electrically interconnecting said first and second electrically conductive members.

23. The apparatus according to claim 15 wherein one of said first and second entrance means is for admitting at least two cables into said housing means and wherein said apparatus is for housing a plurality of splices between electrically conductive wires contained in at least two cables.

24. The apparatus according to claim 1 wherein said housing means are for housing portions of the cables and wherein said apparatus further comprise cable withdrawal preventing means mounted in said housing means and for engaging the portions of the cables and for substantially preventing withdrawal of the cables from said housing means.

25. The apparatus according to claim 20 wherein said apparatus further comprises gripping means for gripping the outer protective covers, wherein said gripping means and said electrically conductive means are formed integrally as a combination member, and wherein said apparatus further comprises mounting means for mounting said combination means substantially stationarily with respect to said housing means to substantially prevent rotation of said combination member with respect to said housing means and to substantially prevent withdrawal of the cables from said housing means.

26. The apparatus according to claim 13 wherein said openings comprise a first plurality of circular openings and a second plurality of oblong openings and wherein said openings are arranged in a predetermined pattern.

27. Apparatus for housing at least one splice between electrically conductive wires contained in at least two cables and for substantially preventing water damage to the splice, comprising:

housing means and a body of material for substantially preventing water damage to the splice, said housing means for receiving the splice and said body of material and for generally surrounding the splice with said body of material, said housing means including opposed and spaced apart interior surfaces; and spacing means provided on and extending outwardly from said interior surfaces and extending outwardly therefrom in an opposed and spaced apart relationship, said spacing means for engaging the splice and for maintaining the splice substantially out of engagement with said interior surfaces and generally suspended within said body of material.

* * * * *

REEXAMINATION CERTIFICATE (3285th)

United States Patent [19]

Schneider et al.

[11] B1 5,371,323

[45] Certificate Issued Jul. 29, 1997

[54] SPLICE HOUSING APPARATUS

[75] Inventors: Pina R. Schneider, Holmdel; Thomas G. Graham, Ocean; Stanley B. Krawiec, Manalapan, all of N.J.

[73] Assignee: Keptel Inc., Tinton Falls, N.J.

Reexamination Request:
No. 90/003,719, Feb. 9, 1995

Reexamination Certificate for:
Patent No.: 5,371,323
Issued: Dec. 6, 1994
Appl. No.: 28,841
Filed: Mar. 10, 1993

[51] Int. Cl.⁶ ................................ H02G 15/113
[52] U.S. Cl. ............... 174/92; 174/87; 174/138 F; 439/367; 439/465; 439/521; 439/687
[58] Field of Search ............... 174/92, 87, 138 F; 439/367, 465, 521, 687

[56] References Cited

U.S. PATENT DOCUMENTS

| | | | |
|---|---|---|---|
| 3,138,657 | 6/1964 | Wengen | 174/92 |
| 3,992,569 | 11/1976 | Hankins et al. | 174/92 |
| 4,554,401 | 11/1985 | Ball | 174/37 |
| 4,647,719 | 3/1987 | Campbell et al. | 174/93 |
| 4,685,981 | 8/1987 | Dienes | 156/48 |
| 4,830,688 | 5/1989 | Staral | 156/48 |
| 5,001,300 | 3/1991 | Messelhi | 174/92 |
| 5,107,077 | 4/1992 | Fox et al. | 174/138 |

OTHER PUBLICATIONS

3M, "8980 Series/4462/Gella™ Reenterable Splice Encapsulation Kits", Issue 1, Apr., 1987.

*Primary Examiner*—Kristine Kincaid

[57] ABSTRACT

Splice housing apparatus are provided on its interior with spacers or spacing members for engaging the splice or splices contained by the apparatus and for maintaining the splice or splices substantially out of engagement with the interior of the apparatus and generally suspended therein whereby a body of material for preventing water damage to the splice or splices can substantially surround the splice or splices and prevent water damage thereto.

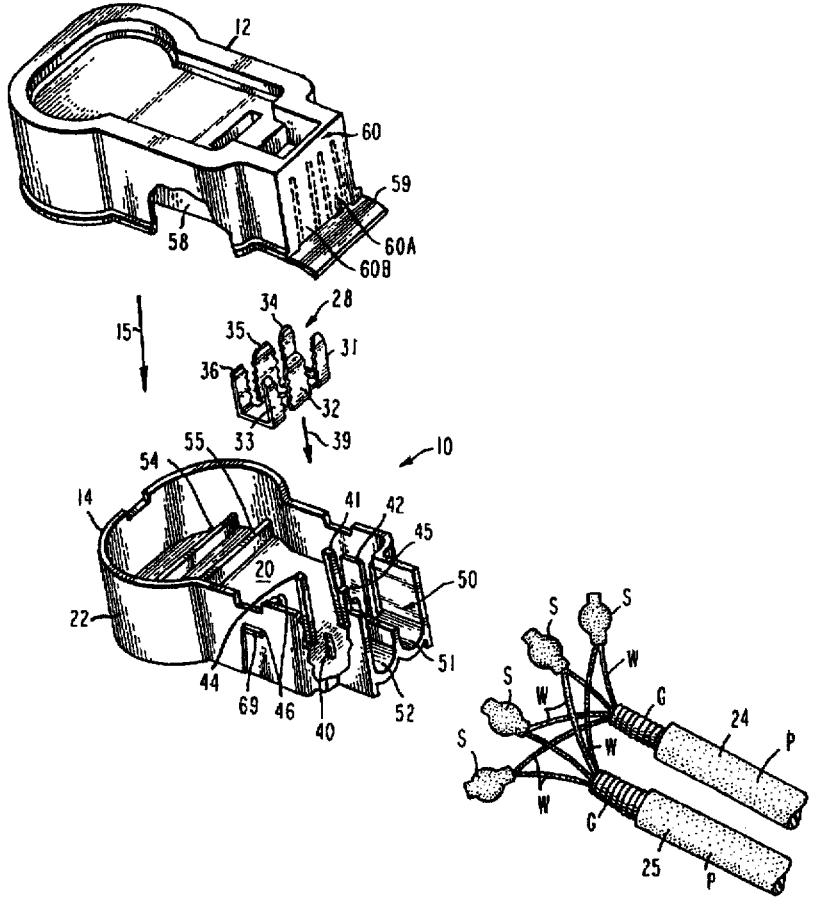

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11, 13 and 25 is confirmed.

Claims 1-10, 12, 14-24 and 27 are cancelled.

Claim 26 is determined to be patentable as amended.

26. The apparatus according to claim [13] *12* wherein said openings comprise a first plurality of circular openings and a second plurality of oblong openings and wherein said openings are arranged in a predetermined pattern.

\* \* \* \* \*